United States Patent [19]

Fischer

[11] Patent Number: 4,842,461
[45] Date of Patent: Jun. 27, 1989

[54] ANCHORING ASSEMBLY
[75] Inventor: Artur Fischer, Waldachtal, Fed. Rep. of Germany
[73] Assignee: fischerwerke Artur Fischer GmbH & Co KG, Tumlingen, Fed. Rep. of Germany
[21] Appl. No.: 174,096
[22] Filed: Mar. 28, 1988
[30] Foreign Application Priority Data
  Apr. 10, 1987 [DE] Fed. Rep. of Germany ....... 3712213
[51] Int. Cl.$^4$ ............................................. F16B 13/06
[52] U.S. Cl. ...................................... 411/55; 411/57; 411/908
[58] Field of Search .................................... 411/34–38, 411/44, 54, 57, 60, 907, 908, 55

[56] References Cited
U.S. PATENT DOCUMENTS
  4,571,136  2/1986  Peek ...................... 411/510
  4,623,290  11/1986 Kikuzawa ............ 411/908
  4,650,384  3/1987  McIntyre ................ 411/57

FOREIGN PATENT DOCUMENTS
  663997  1/1952  United Kingdom ................. 411/54

Primary Examiner—Gary L. Smith
Assistant Examiner—Douglas E. Ringel
Attorney, Agent, or Firm—Michael J. Striker

[57] ABSTRACT

An anchoring bolt including an expansion sleeve and an expander member insertable into the sleeve to expand the latter. The anchoring bolt has an inner thread at the end which faces the end face of the wall of the supporting structure to which an object is to be fastened by the anchoring bolt. A removable spacer is inserted into the borehole of the supporting structure after the anchoring bolt and is engaged with the inner thread thereof so as to determine a distance between the end of the inserted anchoring bolt and the end face of the supporting structure. This distance corresponds to the distance that the expander member is to be drawn into the expansion sleeve.

4 Claims, 1 Drawing Sheet

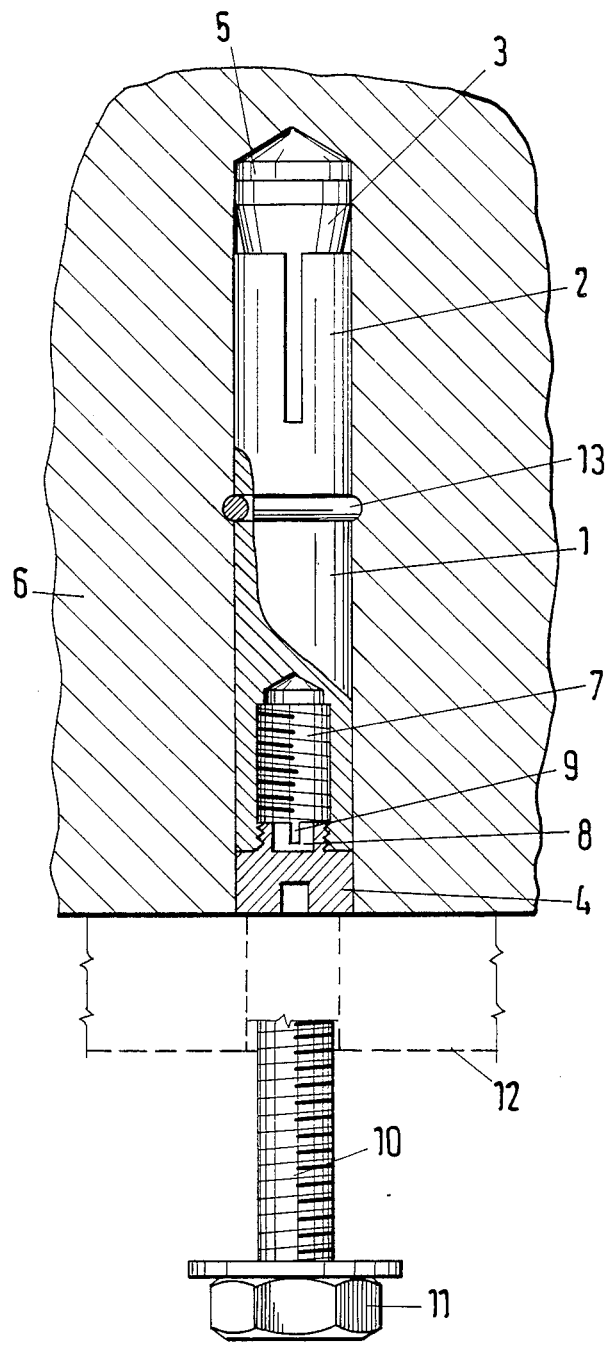

ANCHORING ASSEMBLY

BACKGROUND OF THE INVENTION

The present invention relates to an assembly for anchoring objects to a supporting structure, for example of masonry.

Fastening assemblies of the type under discussion are so-called expansion anchor devices which are known and have been disclosed in a number of applicant's U.S. Pat. Nos., for example 3,964,230; 3,968,721, etc.

A fastening or anchoring assembly of the type under consideration comprises an anchoring threaded bolt, an expansion sleeve and an expander body insertable into the expansion sleeve to outwardly expand the latter to fasten the assembly at the base of the borehole provided in the supporting structure, e.g. masonry. The expander body is normally formed as an expander cone. The expansion sleeve has the end face which faces the expander cone. Elongated slots are provided in the expansion sleeve at said end face, which slots make it possible during the driving-in of the expansion body, the expansion of the sleeve. An inner thread, into which a fastening screw is screwed in to fasten a desired object to the outer face of the masonry, can be provided at the other end of the threaded bolt.

To ensure that the expansion sleeve can spread out or expand during the insertion of the fastening screw, it is required that the expander cone can be pulled into the expansion sleeve. This is possible only when the inner thread provided in the anchoring bolt is sufficiently spaced in the borehole from the outer face of the wall. Only in such case is it possible to pull the anchoring or fastening assembly in the direction of the wall outer face whereby the expander cone would be able to pull into the expansion sleeve rigidly supported in the borehole.

SUMMARY OF THE INVENTION

It is an object of the present invention to provide an improved anchoring assembly.

Another object of the invention is to provide an anchoring assembly which can be easily inserted into a borehole in a required manner to make possible a sufficient expansion action when the fastening screw is driven into the assembly.

These and other objects of the invention are attained by an anchoring assembly for anchoring objects to solid masonry and insertable in a borehole formed in the masonry, comprising a threaded anchoring bolt including at one end thereof an expansion sleeve and at another end thereof an inner thread for receiving a fastening screw for fastening an object to the masonry; an expander member insertable into said expansion sleeve; and a spacer removably-insertable into said inner thread and engageable therein, said spacer, during a driving-in of said anchoring assembly into said borehole defining a distance between said an end of said inner thread and an outer wall face of the masonry.

Due to the provision of the removable spacer which is inserted into the threaded opening of the anchoring bolt it is ensured that the anchoring assembly is always inserted into the borehole with a required distance from the wall end face of the masonry or any other supporting structure. The spacer is removed from the assembly before a fastening screw is screwed into the latter.

An optimal distance between the end of the inner thread and the wall end face can be determined by the spacer in dependence upon the length/size and pulling force of the anchoring assembly selected.

The spacer may be formed as cap of a resilient plastic and is resiliently engaged in said inner thread.

The spacer may have a threaded projection engaged in said inner thread when said spacer is inserted into said borehole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing illustrates a partial sectional view of the anchoring assembly according to the invention, in the position before the spacer has been removed from the anchoring assembly.

DETAILED DESCRIPTION OF THE PREFERRED EMBODIMENTS

Referring now to the drawing in detail it will be seen that the anchoring assembly of the invention comprises a threaded anchoring bolt 1, an expansion sleeve 2, an expander body 3, and a spacer 4. The fastening assembly is driven into a borehole 5 of masonry 6 to a defined shown position. Then spacer 4 which is a cap of plastics is removed by means of a screw driver or the like. Spacer 4 can, by means of its portion 8 engaged in the inner thread 7 provided on an end of the bolt 1, resiliently engage in that inner thread. Portion 8 of spacer 4 has an elongated slot 9 which gives to the portion 8 a sufficient radial spring effect.

After the insertion of the fastening assembly into the borehole formed in masonry 6, the distance element or spacer 4 which defines spacing of the end face of anchoring bolt 1 from the outer face of masonry is removed from the borehole, and a fastening bolt 10 is screwed in into the inner thread 7. As soon as the screw head 11 comes into contact with an object 12 being fastened which is shown by broken line, bolt or screw 10 is rotated further so that the anchoring bolt 1 and expander body 3 are pulled toward the opening of the borehole. The expansion sleeve 2 lies on the spring ring 13 stationarily supported in the borehole so that expander body 3 is drawn in the expansion sleeve 2 and the latter becomes outwardly conically expanded.

In order to obtain an optimal position for the fastening assembly before the expansion of the expander body in accordance with the size and pulling force of the fastening, assembly spacer 4 is inserted into the borehole in the aforedescribed fashion, which engages in the inner thread which faces the upper surface of the wall. The spacer 4 is then removed after the positioning of the fastening assembly in the borehole to free the space for the bolt 10 screwed into thread 7.

The fastening assembly according to the invention ensures a very simple and reliable assembly of the fastening device and its optimal positioning in the borehole.

It will be understood that each of the elements described above, or two or more together, may also find a useful application in other types of anchoring assemblies differing from the types described above.

While the invention has been illustrated and described as embodied in an anchoring assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An anchoring assembly for anchoring objects to solid masonry and insertable in a borehole formed in the masonry, comprising a threaded anchoring bolt including at one end thereof an expansion sleeve and at another end thereof an inner thread for receiving a fastening screw for fastening an object to the masonry; an expander member insertable into said expansion sleeve; and a spacer removably-insertable into said inner thread and engageable therein, said spacer, during a driving-in of said anchoring assembly into said borehole defining a distance between an end of said inner thread and an outer wall face of the masonry, so that when after driving-in of said anchoring assembly into said borehole and replacing said spacer with a fastening screw screwed into said inner thread, said expander member is drawn into said expansion sleeve by a predetermined distance which corresponds to said distance defined said spacer.

2. The assembly as defined in claim 1, wherein said spacer is formed as cap of a resilient plastic and is resiliently engaged in said inner thread.

3. The assembly as defined in claim 1, wherein said spacer has a threaded projection engaged in said inner thread when said spacer is inserted into said borehole.

4. An assembly as defined in claim 1, further comprising a spring ring arranged to immovably hold said expansion sleeve in a borehole.

* * * * *